United States Patent [19]

Mizuno

[11] 4,105,813

[45] * Aug. 8, 1978

[54] TREATMENT OF FABRICS IN MACHINE DRYERS

[75] Inventor: William G. Mizuno, St. Paul, Minn.

[73] Assignee: Economics Laboratory, Inc., St. Paul, Minn.

[ * ] Notice: The portion of the term of this patent subsequent to Mar. 11, 1992, has been disclaimed.

[21] Appl. No.: 699,611

[22] Filed: Jun. 24, 1976

Related U.S. Application Data

[60] Continuation-in-part of Ser. No. 526,697, Nov. 25, 1974, abandoned, which is a division of Ser. No. 254,054, May 17, 1972, Pat. No. 3,870,145.

[51] Int. Cl.$^2$ .......................... B32B 5/18; F26B 3/00

[52] U.S. Cl. ........................................ 428/76; 239/55; 239/57; 252/8.8; 427/242; 427/244; 428/310; 428/314; 428/337; 428/341

[58] Field of Search .................. 427/242, 244; 239/55, 239/56, 57; 206/0.5, 84; 34/60, 72; 428/310, 316, 314, 337, 341, 100, 76; 252/8.6, 8.8

[56] References Cited

U.S. PATENT DOCUMENTS

| | | | |
|---|---|---|---|
| 3,129,888 | 4/1964 | O'Hagan | 239/55 |
| 3,442,692 | 5/1969 | Gaiser | 427/242 |
| 3,634,947 | 1/1972 | Furgal | 34/60 |
| 3,676,199 | 7/1972 | Hewitt et al. | 427/242 |
| 3,686,025 | 8/1972 | Morton | 427/242 |
| 3,698,095 | 10/1972 | Grand et al. | 34/60 X |
| 3,736,668 | 6/1973 | Dillarstone | 34/60 |
| 3,870,145 | 3/1975 | Mizuno | 206/84 |
| 4,004,685 | 1/1977 | Mizuno et al. | 34/60 X |

*Primary Examiner*—Michael F. Esposito
*Assistant Examiner*—Stuart D. Frenkel
*Attorney, Agent, or Firm*—Merchant, Gould, Smith, Edell, Welter & Schmidt

[57] ABSTRACT

Fabrics are treated in machine drying apparatus to reduce static electricity carried by the fabrics, soften the fabrics and improve other fabric properties. A sponge impregnated with a heat softenable solid or semi-solid fabric-conditioning agent is placed within the dryer drum and the fabrics are tumbled in the dryer thereby causing some of the fabric-conditioning agent to be transferred to the fabric. When the dryer is heated, the heat of the dryer helps the fabric-conditioning agent to soften and assists in its distribution over the surface of fabric with which the impregnated sponge is brought into tumbling contact.

5 Claims, 3 Drawing Figures

TREATMENT OF FABRICS IN MACHINE DRYERS

CROSS REFERENCE TO RELATED APPLICATIONS

This application is a continuation-in-part of co-pending application, Ser. No. 526,697 filed Nov. 25, 1974, now abandoned which is a divisional application of Ser. No. 254,054, filed May 17, 1972, now U.S. Pat. No. 3,870,145 issued Mar. 11, 1975. For related technology see co-pending application, Ser. No. 232,432 filed Mar. 7, 1972 now U.S. Pat. No. 4,004,685 and a divisional application of said application; Ser. No. 470,565 filed May 16, 1974, which is now U.S. Pat. No. 3,967,008 issued June 29, 1976.

BACKGROUND OF THE INVENTION

In laundering it is common to treat various types of fabrics such as wool, cotton, silk, nylon, polyester, permanent-press, and the like with chemicals which are fabric-conditioning or treating agents to render the fabrics soft to the touch, to reduce tangling, knotting or wrinkling, to render them free of static electricity, to render them bacteria-resistant, to deodorize them, and to otherwise condition them. The use of fabric conditioners permits dried clothes to be sorted and folded more easily and quickly. These results are ordinarily achieved by introducing an aqueous solution or dispersion of the fabric-conditioning agent into the wash water during the washing cycle of the laundry process or by introducing such an aqueous solution or dispersion of fabric-conditioning agent into the rinse water during the rinsing cycle of the laundry process. Experience has shown that addition of the fabric-conditioning agents during the rinse cycle of the laundry process is often significantly more effective than addition of the fabric-conditioning agents during the wash cycle. Since some clothes washing machines do not have automatic fabric softener dispensers, a homemaker must be present during the washing of fabrics to manually add the fabric conditioner during the rinse cycle. This is inconvenient and, consequently, is often forgotten. Even when the washing machine is equipped with an automatic dispenser, the use of a fabric-conditioner is still a messy operation requiring measuring of a liquid suspension, is wasteful and is ecologically undesirable because a significant amount of the fabric conditioner is lost to the drain. Moreover, the fabric softener is usually added to the deep rinse where some soap or detergent and soil may still be present, leading to redeposition problems and interaction between the anionic detergent and cationic softeners (which are mutually incompatible), with subsequent loss of efficiency.

As a result of combinations of the above factors, a survey has shown that many homemakers use fabric softeners irregularly and on the basis of "when I remember" or "when it is needed" with equally irregular performance as regards antistatic and other fabric conditioning properties.

The use of liquid fabric conditioning agents in machine dryers has been suggested in the past, but the idea has not gained widespread commercial acceptance probably as a result of such factors as the need for complex dispensing equipment.

Recently, means and techniques have been developed for dispensing solid fabric conditioners in a machine laundry dryer. Flexible substrates coated or impregnated with a fabric softening and/or anti-static agent and designed for use in clothes dryers are now commercially available. These commercially available articles are pre-measured, disposable, single-use sheets and can be relatively expensive to use. Perhaps the most severe difficulty with these coated or impregnated substrates has been the danger that they may mark or stain the clothes in the dryer. One route for overcoming this difficulty is to coat the flexible substrate with a solid chemical agent which remains solid throughout the operating temperature range of the dryer (e.g. throughout the range of 50°-90° C.). The flexing of the flexible substrate which accompanies the clothes tumbling action of a dryer drum is presently believed to cause the coating of the chemical agent to develop a flaking action, resulting in the transfer of the agent to the clothes in the form of tiny solid flakes or crystals. These flakes of the solid agent are apparently considered less likely to cause staining as compared to an agent which is molten or significantly softened within the 50°-90° C. range. This coated flexible substrate approach is believed to be best suited for single-use flexible sheets which are separated out from the dryer load after the drying cycle and then discarded.

PRIOR ART

The prior art in this area is voluminous and thirty to forty U.S. Pat. Nos. and many foreign patents could easily be cited. However, it is presently believed that U.S. Pat. No. 3,686,025 (Morton) issued Aug. 22, 1972 is the most important. U.S. Pat. No. 3,442,692 (Gaiser) issued May 6, 1969 and U.S. Pat. No. 3,634,947 (Furgal et al.) issued Jan. 18, 1972 are also of interest.

SUMMARY OF THE INVENTION

The present invention is based on the discovery that desired fabric properties (e.g. anti-static properties) can be obtained by treating the fabric in a machine dryer with a very small amount of a fabric-conditioning agent such as an anti-static agent, which agent is present in a solid or semi-solid, consolidated reusable form. Briefly described, the method of the present invention involves placing within the dryer a sponge which has been impregnated from its surface to its interior (as contrasted to a coating) with a heat softenable material comprising a fabric conditioning agent such as an anti-static agent. To best control dispensing of the fabric conditioning agent, this impregnated sponge is contained within a dispenser, a portion of which is permeable so that the fabric-conditioner can be released through the dispenser when it is softened by the heat of the dryer. For example, a small rectangular sponge (e.g. 5 cm × 10 cm × 1 cm) can be impregnated with such a fabric conditioning agent and then encased within an envelope comprising woven or nonwoven fabric. The fabric can be woven or nonwoven because the principal requirement of the envelope is that it have a permeable portion, and a wide variety of fabrics or other materials (e.g. thin layers of foam or porous film) can be selected and arranged to regulate agent migration, i.e. to provide the appropriate degree of permeability or the appropriate rate for releasing fabric conditioner from the impregnated sponge to the surface of the dispenser which contacts the load in the dryer. Nonpermeable portions of the envelope, if any, can comprise polymeric film or the like. In an alternative embodiment of the envelope concept, the envelope can be, in a sense, integral with or inherent in the sponge structure itself by providing a pore size gradiant, as in "pack molded" foams. In this embodiment, the pores in the interior of the sponge are much larger than those near the surface. Both embodiments use, in effect, a porous material to control the migration rate to one or more surfaces of the fabric softening agent dispenser.

A particularly advantageous method of this invention involves mounting the sponge on a leading edge of one of the dryer vanes. See application Ser. No. 232,432 filed Mar. 7, 1972. However, where attachment to the dryer vane is not practical (e.g. a "community" dryer in an apartment house, a dryer in a self-service laundromat) the sponge can be tumbled with the clothes. Minimization of the marking and staining (which can occur if the dispenser comes in direct and prolonged contact with a particular time of clothes) can be accomplished by making the dispenser large enough so that it will not become entrapped in shirt sleeves, etc.; by varying the chemicals and additives used to control permeability; and/or by enclosing the dispenser in an overwrap which further controls direct contact between the sponge and the clothes being dried. The fabric conditioning agent will have a softening range within the range of the dryer temperature. When the fabric to be treated is tumbled within the heated dryer drum, a small portion of the anit-static agent is transferred to the fabric during each drying cycle. The dispenser can thus be reused a minimum of 10 times and preferably 40–50 times.

THE DRAWINGS

DETAILED DESCRIPTION

Method of Treating Fabrics

The present method for treating fabrics in machine dryers can be understood by referring to the following description when read in conjunction with the drawings.

Figure 1:
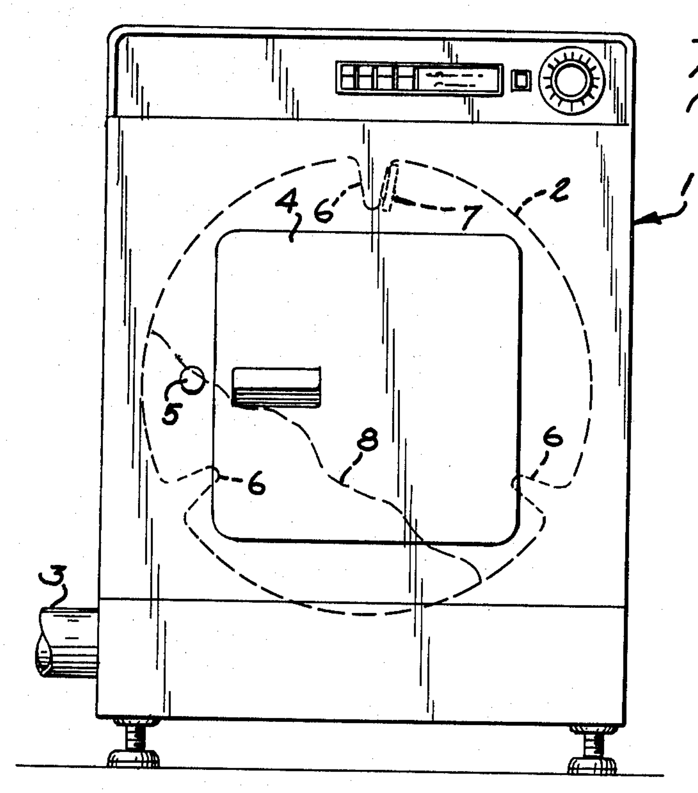
FIG. 1 is a front view of a machine dryer.

In FIG. 1 is shown a machine dryer generally designated by the Numeral 1. The dryer 1 includes a heat source (not shown) which may be electric, gas, or otherwise. The dryer is provided with a rotating drum 2 and an exhaust 3. Dryer 1 is further provided with an access door 4 and a latch 5.

Rotating drum 2 of dryer 1 is typically provided with a plurality of vanes 6 which extend inwardly from the cylindrical wall of drum 2 and which are generally parallel to the axis of rotation of drum 2. Although drum 2 might rotate in either direction, it has arbitrarily been shown in FIG. 1 to rotate in a clockwise direction. An impregnated sponge 7 is carried by one of the vanes 6. The purpose of impregnated sponge 7 is to distribute a fabric-conditioning agent onto fabric 8 being tumbled within drum 2. As shown in FIG. 1, the impregnated sponge 7 is secured to a leading edge of one of the vanes 6. However, if desired, several impregnated sponges 7 can be attached to a single vane 6 or several impregnated sponges 7 can be attached to different vanes 6. Although an impregnated sponge 7 can be loosely tumbled with the clothes or other fabric 8 (i.e. it does no need to be attached to the drum), attaching the impregnated sponge 7 to the drum 2 avoids the disadvantage of having to sort the impregnated sponge 7 from the clothes 8 after each dryer load. Moreover, various placements of the impregnated sponge 7 in drum 2 can be used to alter dispensing rates or compensate for different dryer types, makes, temperatures, drying cycles, and the like.

In operation, fabric 8 (usually damp and ready to be dried) is placed within drum 2 and the fabric 8 (e.g. clothes) is tumbled within the drum 2 by rotation of the drum 2. In this manner, the fabric 8 is brought into repeated contact with a surface of impregnated sponge 7. The heat from the dryer causes the fabric-conditioning agent to soften and be transferred to the fabric 8 by contact between the tumbling fabric 8 and the surface of impregnated sponge 7.

It has been observed that after sponge 7 has been used, beneficial anti-static properties can be obtained for a cycle or more by merely tumbling dry clothes along with the sponge 7 in an unheated dryer. Presumably, fabric-conditioner which is on or near the outer surface of the impregnated sponge 7 is transferred to the fabric through abrading contact with the fabric.

The Impregnated Sponge

Figure 2:
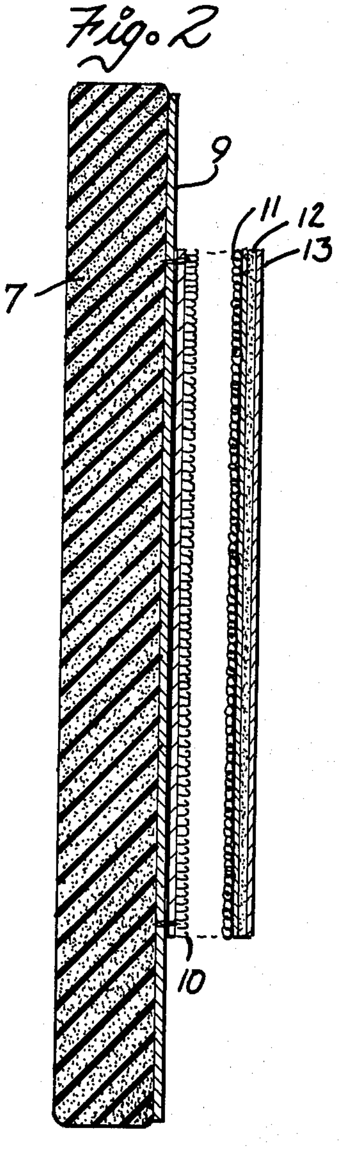
FIG. 2 is a cross-sectional veiw of a sponge which has been impregnated with a heat softenable fabric conditioning agent.

The details of construction of the impregnated sponge 7 of FIG. 1 are shown in detail in FIG. 2. As will be explained subsequently, the impregnated sponge 7 can be covered by an envelope or surface comprising permeable material (envelope 14 of FIG. 3). Although sponge 7 is hereinafter described with reference to means for attaching it to a dryer drum 2, it will be appreciated that the fastening means could be omitted and the impregnated sponge 7 simply tumbled loosely within drum 2. However, best results are obtained if the impregnated sponge 7 is attached to some portion of the dryer drum 2, preferably a vane 6.

Impregnated sponge 7 can be prepared by melting one or more fabric conditioning agents (e.g. a normally solid quaternary ammonium chloride), optionally in admixture with various additives, carriers or the like, and pouring or otherwise contacting a sponge with the molten mixture. Usually, the amount of molten material will be about 0.3 to 0.7 grams per cubic centimeter of unimpregnated sponge, although more or less molten material may be used. Impregnation of the sponge can be assisted by kneading or otherwise manipulating the sponge to cause the molten fabric conditioning agent to penetrate further into the interior of the sponge. The sponge used in the practice of the present invention may be of natural or synthetic origin (e.g. a polyurethane foam). Desirably, the pore size of the sponge will be relatively fine, usually averaging between about 0.05–4 millimeters (e.g. 0.1 to 2 mm) in diameter as measured in the plane of a cut surface of the sponge.

After a sponge has been saturated or otherwise impregnated with molten fabric conditioning agent, the impregnated sponge 7 will be allowed to cool to room temperature. It will then become relatively firm or rigid. When properly impregnated, the cell structure of the sponge surface may still be seen (i.e. the cells are not over-filled with fabric conditioning agent).

As previously indicated, it is desirable for the impregnated sponge 7 to be pre-positioned within the drum 2 of dryer 1. Although a variety of means may be used to fasten the impregnated sponge 7 to the dryer, the arrangement shown in FIG. 2 is particularly effective. As shown in FIG. 2, an impregnated sponge pad 7 is backed with cloth or heavy paper 9. To this assembly is attached (by sewing or adhesives) the hook half 10 of a hook and loop fastener (e.g. Velcro). The loop half 11 of the hook and loop fastener is attached to an adhesive strip 12, one surface of which is protected with glazed backing paper 13.

When it is desired to install the impregnated sponge 7 in a clothes dryer 1, the glazed backing paper 13 can be removed from adhesive strip 12 and the adhesive strip firmly secured by pressing it against the leading edge of a dryer vane 6. The impregnated sponge pad 7 can then be selectively attached or removed at will by merely pressing the hook half 10 of the hook and loop fastener into the loop half 11 of the hook and loop fastener or by pulling the hook and loop halves of the fasteners apart.

Figure 3:
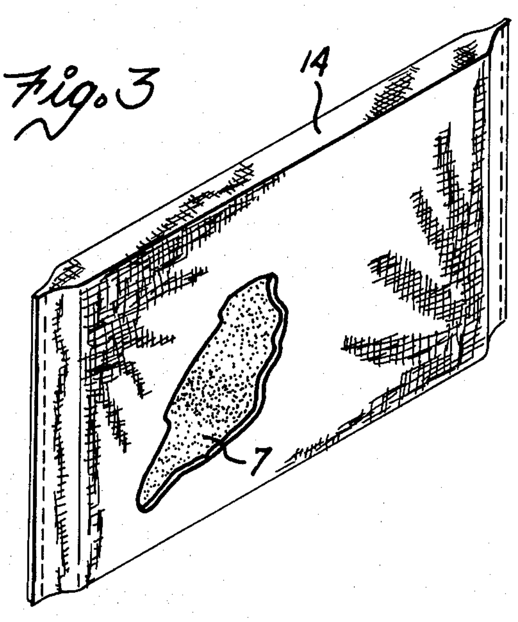
FIG. 3 is a perspective view of an impregnated sponge encased within a dispenser comprising a permeable material.

To control and/or reduce the rate of transfer or dispensing of fabric conditioning agent from impregnated sponge 7 to the clothes 8, particularly during the early cycles in which the impregnated sponge 7 is used, a woven fabric envelope 14 covers sponge 7, as shown in FIG. 3. A high degree of control over the dispensing rate of the fabric conditioning agent is believed to result from the combination of the gel-like softened state of the agent in sponge 7 and the controlled permeation through the permeable material, in this case the woven fabric envelope 14. The permeable material can be woven or nonwoven as long as the envelope has a permeable portion. The side of the envelope not shown can be provided with fastening means (such as shown in FIG. 2) for attaching the envelope-covered, impregnated sponge 7 to a portion of the dryer drum 2.

The structure shown in FIG. 2 is suitable for use in this invention without a cover or envelope over sponge 7, particularly in the case where the pores essentially at the exposed surfaces of sponge 7 (i.e. the surfaces not in contact with heavy paper 9) are very tiny, so that these exposed surfaces provide the desired controlled permeation rate.

Fabric-Conditioning Agents

The fabric-conditioning agents useful in the practice of the present invention are those chemicals used for fabric-conditioning, particularly anti-static agents, which either soften when heated to the operating temperature of a laundry dryer or which can be made to soften at such temperatures by proper compounding with other chemicals. Liquid fabric-conditioning agents are not practical for use in the present invention unless they can be formed into a suitable gel or other heat softenable solid.

A particularly useful class of fabric-conditioning agents comprises the quaternary ammonium salts. Desirably, such quaternary salts will be the chlorides and will contain at least one and usually two $C_{12}$–$C_{24}$ fatty acid radicals (e.g. $C_{18}$ radicals). One preferred product is dimethyl di (hydrogenated tallow) ammonium chloride, whether used alone or in a mixture with other chemicals. If desired, two or more fabric-conditioning agents can be blended together. Additives can be used to modify the softening point of the fabric conditioning agent or mixtures of agents and to control the rate of migration or penetration of the agents from the contact surface of impregnated sponge 7 or through the permeable portion of a dispenser in which the sponge is located.

A particularly useful mixture of fabric-conditioning agent is a mixture of stearyl dimethyl benzyl ammonium chloride and dimethyl di (hydrogenated tallow) ammonium chloride in a weight ratio of 2–4:1.

In formulating any mass containing a fabric conditioner the mass should have a softening point within the operating temperature range of the dryer. It is important that the mass have a broad softening point range (i.e. it softens over a wide range of temperatures) as contrasted to a sharply defined or narrow melting point or softening point. By softening point range is meant the range of temperatures over which the mass is in the softened state, e.g. a state characterized by a non-flowable gel-like mass or a heavy or viscous mush, as opposed to a molten, flowable liquid. The existence of the mass as a nonflowable gel-like mass over a broad range of temperatures within the operating temperatures of a dryer is an important factor in controlling the rate of migration of the fabric conditioning agent. Fabric conditioning agent formulations having a softening point range of at least 10 Centigrade degrees, and preferably at least 20 Centigrade degrees are preferred. It presently appears that optimum performance (including optimum cooperation between the softened mass and the fabric envelope enclosing the mass) is obtained when the conditioning agent formulation is softened within the temperature range of 50°–90° C. It also appears to be neither necessary nor desirable for a transition from the softened state to a flowable liquid to occur within the 50°–90° C. range; it is generally preferred that the softened state be retained through as much of this range as possible. The existence of the softened stage below 50° C. or above 90° C. can be desirable, but is not essential to the objectives of this invention. For ease of impregnation of the sponge during manufacture, however, it is preferred that the conditoning agent formulation have essentially the flowability properties of a liquid at temperatures below 200° C.

The present invention is further illustrated by the following specific example. Unless otherwise indicated, all parts and percentages are by weight.

EXAMPLE 1

A 0.95 centimeter ($\frac{3}{8}$ inch) thick polyurethane sponge, of relatively fine porosity (0.3 to 1 mm cell size) and weighing about 0.56 gram per cubic centimeter, backed with a heavy glazed paper was cut into rectangular pieces 3.49 centimeter (1$\frac{3}{8}$ inch) by 6.98 centimeter (2$\frac{3}{4}$ inch). Each rectangular piece had a volume of about 23.2 cubic centimeters (1.42 cubic inches) and weighed about 1.3 grams. Next, the hook half of a Velcro fastener 1.90 centimeter ($\frac{3}{4}$ inch) by 5.08 centimeter (2 inch) and weighing 0.90 gram was sewn onto the paper backed side of each sponge pad, with the hooks facing away from the paper back.

A powdered blend consisting of 25 percent dimethyl di (hydrogenated tallow) ammonium chloride, 72 percent stearyl dimethyl benzyl ammonium chloride and 3 percent coconut monoethanolamide was carefully heated (to avoid discoloration) to 160°–180° C. in a beaker and poured over the sponges. At 160° C., it was found necessary to squeeze or knead the sponges with a glass rod to work the molten fabric conditioner into the sponge interior. At 180° C., the molten fabric conditioner readily penetrated the sponges with very little squeezing action. Approximately 15–20 grams of the molten mixture was impregnated into each sponge, the exact weight being determined by weighing the sponges before and after impregnating. This corresponded to more than 11 but less than 20 grams of fabric conditioner per gram of sponge (e.g. 11.5:1 to 15.4:1). Before impregnation, the sponges weighed about 1.3 grams each and the fasteners about .9 gram each for a total of about 2.2 grams for each sponge with fastener. The impregnated sponges were allowed to cool to room temperature whereupon they hardened or set up as a firm bar. After impregnation and cooling, the cell structure at the sponge surfaces could still be seen.

To complete the assembly of each sponge, the mating loop half of the Velcro fastener was positioned over the hook half (now attached to the impregnated sponge) and the two halves were pressed together. Next a piece of double faced adhesive tape 1.90 centimeter (¾ inch) by 5.08 centimeter (2 inch) by 0.16 centimeter (1/16 inch) was placed over the back side of the loop half of the Velcro fastener and pressed to form a bond, leaving the glazed protective paper of the urethane adhesive tape in place to protect the virgin side of the tape. For test purposes the impregnated sponges were attached to a suitable interior clothes dryer surface by first thoroughly cleaning the immediate area of the attachment. Next the glazed protective paper was removed from the urethane adhesive tape and the impregnated sponge was positioned and pressed onto the desired location. To assure firmer adhesion of the loop side of the Velcro fastener, the impregnated sponge was carefully detached and the adhering loop side (which remained attached to the clothes dryer surface) was firmly pressed into place by rubbing briskly with the fingers. The impregnated sponge was reattached to the drum by carefully aligning the mating halves of the Velcro fastener and pressing firmly.

Two of the impregnated sponges were evaluated by running a 20 cycle wash and dry test using a normal 7-8 pound load of clothes with dryer settings of: (a) 120° F; and (b) 160° F. respectively. The actual exit air temperature was recorded at both settings with a recording thermometer and found to be about 130° and 150° F., respectively, for these two settings. The use of fabric softener for each cycle was determined by detaching and weighing the impregnated sponge pad after each dry cycle and reattaching it for the next cycle.

The weight loss during the early cycles was somewhat higher than for the later cycles during the 20 cycle runs. The rate of weight loss may be controlled by varying the porosity, varying the sponge cell strength, altering the softening range of the fabric conditioner, covering the impregnated sponge with a thin, fine, poromeric or permeable membrane, by using a sponge with poregradient such that the base will have relatively large pores and the contact surface will have relatively fine pores, or by other means.

The 20 cycle wash and dry tests summarized in Table I (120° F. Dryer Setting) and in Table II (160° F. Dryer Setting) demonstrate the advantages of the present invention. "Marking" refers to the possible tendency of the fabric softener to be transferred to portions of the fabric in such large amount as to leave readily detectable, visible marks on the fabric.

In subsequent experiments, a cloth envelope was used to control the weight loss/cycle more accurately. It was found that the initial surge-like weight losses in the first five cycles and the relatively small weight losses in the sixteenth to twentieth cycles could be brought closer to the desired average by means of the metering action of the envelope.

TABLE I

Weight Loss and Performance of Sponge Impregnated Antistat of Example 1

Dryer Setting 120° F.

| Number of Wash & Dry Cycles Completed | Weight of Impregnated Sponge, gms | Weight loss/cycle gms | Observation for Static, Cling, Marking, etc. |
|---|---|---|---|
| 0 | 14.3 | — | — |
| 5 | 11.6 | 0.5 | No static or clinging, tangling, knotting, no marking for all cycles |
| 10 | 10.9 | 0.14 | No static or clinging, tangling, knotting, no marking for all cycles |
| 15 | 10.5 | 0.10 | No static or clinging, tangling, knotting, no marking for all cycles |
| 20 | 10.1 | 0.10 | No static or clinging, tangling, knotting, no marking for all cycles |

Average weight loss/cycle for 20 cycles: 0.2 gm.

TABLE II

Weight Loss and Performance of Sponge Impregnated Antistat of Example 1

Dryer Setting 160° F.

| Number of Wash & Dry Cycles Completed | Weight of Impregnated Sponge, gms | Weight loss/cycle gms | Observation for Static, Cling, Marking, etc. |
|---|---|---|---|
| 0 | 19.7 | — | — |
| 5 | 15.0 | 0.9 | No static or clinging, tangling, knotting, no marking for all cycles |
| 10 | 13.3 | 0.3 | No static or clinging, tangling, knotting, no marking for all cycles |
| 15 | 12.2 | 0.2 | No static or clinging, tangling, knotting, no marking for all cycles |
| 20 | 11.2 | 0.2 | No static or clinging, tangling, knotting, no marking for all cycles |

Average weight loss/cycle for 20 cycles: 0.42 gm.

What is claimed is:

1. An article of manufacture comprising:

a. an impregnated sponge having an average pore size of 0.05 to 4 millimeters which has been impregnated from its surface into its interior with about 0.3 to about 0.7 gram, per cubic centimeter of unimpregnated sponge, of a heat-softenable fabric conditioning agent comprising a quaternary ammonium salt, said fabric conditioning agent having a softening point range of at least 10 Centigrade degrees and being in the softened state in the range of 50° to 90° C., and b. a porous material at a surface of said impregnated sponge, said porous material comprising permeable material which is permeable to the fabric conditioning agent under the conditions of use; said permeable material being selected and arranged to release said agent from the impregnated sponge to a surface of the porous material when the fabric conditioner is softened by the heat of the dryer; said permeable material being also selected and arranged to permit said impregnated sponge to act as a reservoir for said agent, releasing a minor amount of said agent in each of at least about 10 drying cycles of said machine dryer.

2. The product of claim 1 in which the sponge has an average pore size of from 0.1 to 2 mm.

3. The product of claim 1 wherein the impregnated sponge is contained within a cloth envelope comprising said permeable material.

4. The product of claim 1 wherein the fabric conditioning agent comprises dimethyl di (hydrogenated tallow) ammonium chloride.

5. The product of claim 1 wherein the sponge has a smaller pore size along a surface of the sponge relative to the pore size in the interior of the sponge.

* * * * *